US006046697A

United States Patent [19]

Overbury et al.

[11] Patent Number: 6,046,697

[45] Date of Patent: Apr. 4, 2000

[54] PHASE CONTROL OF TRANSMISSION ANTENNAS

[75] Inventors: Francis Giles Overbury, Great Dunmow; Jonathan Fraser Page, Ross On Wye, both of United Kingdom

[73] Assignee: Northern Telecom Limited, Montreal, Canada

[21] Appl. No.: 08/924,220

[22] Filed: Sep. 5, 1997

[51] Int. Cl.[7] ........................... G01S 13/00; H01Q 03/00

[52] U.S. Cl. ........................................... 342/360; 342/174

[58] Field of Search .................................... 342/173, 174, 342/360, 371

[56] References Cited

U.S. PATENT DOCUMENTS

| | | | |
|---|---|---|---|
| 4,176,354 | 11/1979 | Hsiao et al. | 343/17.7 |
| 4,532,518 | 7/1985 | Gaglione et al. . | |
| 4,949,090 | 8/1990 | Tamii et al. | 342/173 |
| 5,038,146 | 8/1991 | Troychak et al. | 342/173 |
| 5,072,228 | 12/1991 | Kuwahara . | |
| 5,187,486 | 2/1993 | Kölzer | 342/360 |
| 5,530,449 | 6/1996 | Wachs et al. | 342/174 |
| 5,644,316 | 7/1997 | Lewis et al. | 342/174 |
| 5,771,019 | 6/1998 | Wachs et al. | 342/442 |

FOREIGN PATENT DOCUMENTS

| | | |
|---|---|---|
| 0812027 A2 | 12/1997 | European Pat. Off. . |
| 2300076 | 10/1996 | United Kingdom . |
| WO 95/34103 | 12/1995 | WIPO . |

*Primary Examiner*—Mark Hellner
*Attorney, Agent, or Firm*—John D. Crane

[57] ABSTRACT

A phase array antenna is monitored by applying to each element of the array in turn a signal known characteristics, detecting the signal output from the selected element as a result of the applied known signal, and comparing the detected signal with the applied signal whereby to monitor changes in the applied signal due to the signal path. The detection is preferably carried out using a single monitoring unit in the near-field of each antenna element. Alternatively the detection is carried out using a single source of applied signals a number of individual monitoring units one for each element of the array, and a switching device for selecting the element of the array to be monitored.

10 Claims, 4 Drawing Sheets

PHASE CONTROL OF TRANSMISSION ANTENNAS

TECHNICAL FIELD OF THE INVENTION

The present invention relates to a method and apparatus for the phase control of transmission antennas where the desired beam shape resulting from transmission from a plurality of antenna elements needs to be closely maintained.

BACKGROUND OF THE INVENTION

Currently, the above requirement is most common in the area of cellular communication systems. In such systems, the traffic handling capability has been shown to be improved by the inclusion of separate power amplifiers in the feed to each individual antenna array element, as opposed to the use of single higher powered amplifier device before beam formation. Further, in the interest of reducing the cost of base station maintenance, it has been proposed to site power amplifiers and diplexers at the base of the tower on which the antenna array is mounted. This normally involves lengthy cable runs of as much as 30 meters between each power amplifier and the antenna element with which it is associated.

It is essential, for preserving the desired beam shape, that each antenna element is supplied with the correct phase of signal so that the overall desired beam shape is preserved. This in turn means that there needs to be exact phase matching from the point of beam formation, through power amplification, diplexing and the up-feed cables to the individual antenna elements. However, this is very hard to achieve in the case where lengthy cable runs exist especially if the cable runs are exposed to different envoronmental conditions as individual amplifiers tend to be sensitive to signal amplitude, temperature and small independent variations. Also diplexers involve the use of high Q filter elements which are potentially susceptible to phase change. The problem is exacerbated by the fact that the individual amplifiers also produce phase changes such as exposure to heat from strong sunlight.

The problem of phase variations in a phase array antenna is known and various attempts have been made to solve the problem. U.S. Pat. No. 5,072,228 discloses an arrangement in which a phased array antenna has a digital phase shifter associated with each radiating element. The beam pattern is sensed using an integral monitor manifold which receives a part of the signal from all the radiating elements, produces a resultant signal which is then used as an input to a processor for calculating the phase error of a signal radiated from each element. The problem with this arrangement is that the changes due to each individual element are small as compared with the resultant signal from all the elements. This, in turn means that the arrangement does not produce a good measure of each individual element.

It is an object of the present invention to overcome the problems of the prior arrangements.

SUMMARY OF THE INVENTION

The present invention provides a method of monitoring an antenna array comprising a plurality of antenna elements each fed with a signal from a beam forming circuit using a respective signal path, the method comprising the steps of:

a) selecting one of the elements of the array;

b) applying a signal of known characteristics to said selected element;

c) detecting a signal indicative of the output from the selected element;

d) comparing the detected signal with the applied signal whereby to generate an error signal corresponding to any changes in the characteristics of the applied signal due to the signal path;

e) using the error signal to access a stored value in a look-up table; and f) repeating steps a) to e) for each element of the array.

In a transmission antenna array comprising a plurality of antenna elements each fed with a respective signal from a beam forming circuit, means for monitoring the output of the antenna array elements, and means for controlling the phase of the signal fed to the power amplifier for that antenna array element so as to ensure that the output from the antenna corresponds to the desired beam shape, the improvement comprising a single monitoring device and means for causing the single monitoring device to monitor the output from each element in turn.

The advantage of this arrangement is that because a single monitoring device is used in turn for each element, there is a common path for all corrections. Errors due to the monitoring itself are thus reduced. The use of a single device monitoring each element in turn means that the resultant signals are large and hence any correction can be accurate.

The single monitoring device may be a probe in the near-field of each antenna element so that phase changes due to the antenna itself or due to external effects such as snow can be accounted for. Alternatively, the feeds to the antenna elements are sequentially coupled to a signal detector via a switching arrangement and a single conductor but this would enable only phase changes in the feed-line between the beam forming circuit and the antenna to be compensated.

The control means includes a phase shifting device in each signal path from the beam forming circuit to a respective antenna array element for adjusting the phase of the signal in the path. The phase shifting device is controlled by a phase control circuit responsive to a signal indicative of the difference between the phase of the signal output from the beam forming circuit and the signal detected by the monitoring means. The phase control means preferably uses one path as a reference and then adjusts all other paths such that the differential phase between all paths remains constant in order to preserve the desired beam shape.

The phase control may be carried out on-line and at suitable intervals, as frequently as is found to be necessary. Cellular telephone transmission systems are particular susceptible for such control as they have short gaps in transmissions which can be utilized for phase control purposes.

BRIEF DESCRIPTION OF THE DRAWINGS

In order that the present invention be more readily understood, embodiments thereof will now be described by way of example with reference to the accompanying drawings in which.

DETAILED DESCRIPTION OF THE INVENTION

Figure 1:
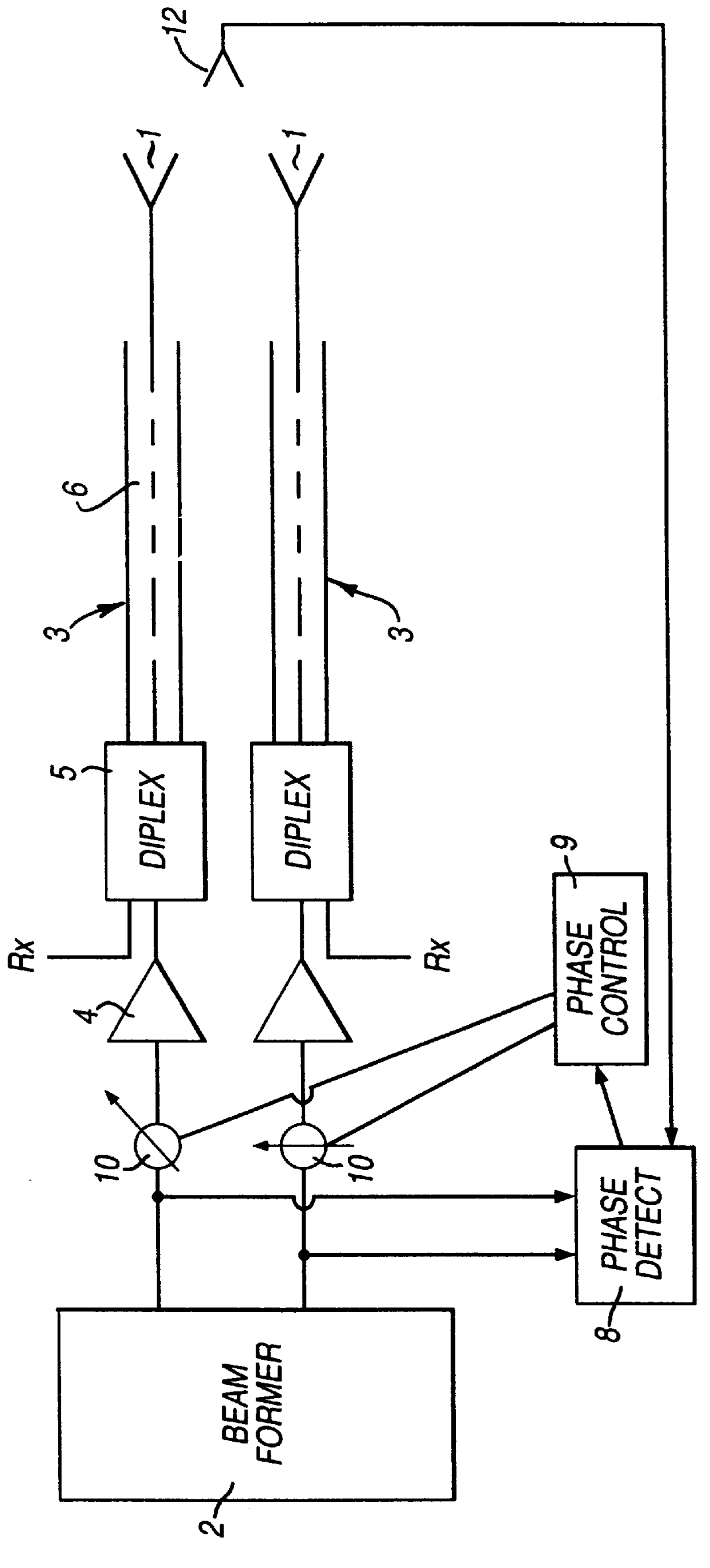
FIG. 1 is a first embodiment of the present invention.

Referring to FIG. 1, a transmission antenna system comprises a plurality of antenna elements 1 each fed with a respective signal from respective outputs of a beam forming circuit 2 via a signal path indicated in general by reference numeral 3. Each path consists of a power amplifier 4, a diplex circuit 5 and a conductor in the form of a coaxial cable 6 connecting the diplex circuit to the antenna element 1.

With such an arrangement, the beam forming circuit 2 will transmit suitable signals to the antenna array elements 1 such that a desired beam shape will be produced. However, this will only occur if there is exact phase matching from the point of beam forming, through the power amplifiers, diplexers and upfeed cables to the individual antenna elements. This exact phase matching cannot be guaranteed simply by using apparently identical components and consequently it is proposed to add a closed loop phase adjustment of each signal path so as to compensate for any phase errors in the signal path. This is achieved by providing a signal monitor which feeds a signal indicative of the phase of the signal at a selected one of the antenna elements back to a phase error detection circuit 8 where the output phase is compared with the phase of the desired signal output from the beam former 2 in order to produce an error signal which is then fed to a respective phase control circuit 9 which in turn is used to control a phase adjustment circuit 10 in the respective signal path. The process is repeated for each antenna element.

In the embodiment shown in FIG. 1, the output signal monitoring is achieved by placing at a single monitor probe 12 in the near field of the antenna array. The output of the probe 12 is fed as an input to the phase detection circuit 8 via a single non-phase critical cable so as to avoid errors.

In use, the system preferably uses a short "quiet" period in the normal transmission. This might consist of a natural break in transmission based on an allocated time-slot or some other format characteristic. A more complex alternative would be the super-imposition of a low level coded transmission identifiable by the phase detector circuit 8 which low level coded transmission could be separately fed to each element of the array.

It is preferred to utilise a special test signal fed through the beam former and into a selected antenna array element in turn but it is equally possible to utilise a suitable part of an actual signal to be transmitted. On installation, all values, in terms of the relative phase between each signal path and one taken as a reference are recorded in memory using the probe 12. Any departure from these initial values of differential phase in operation will represent a drift in one of the signal paths. If a change in any of the differential phases is noted, a correction will be made by the phase control mechanism in a manner which will be described later.

Figure 2:
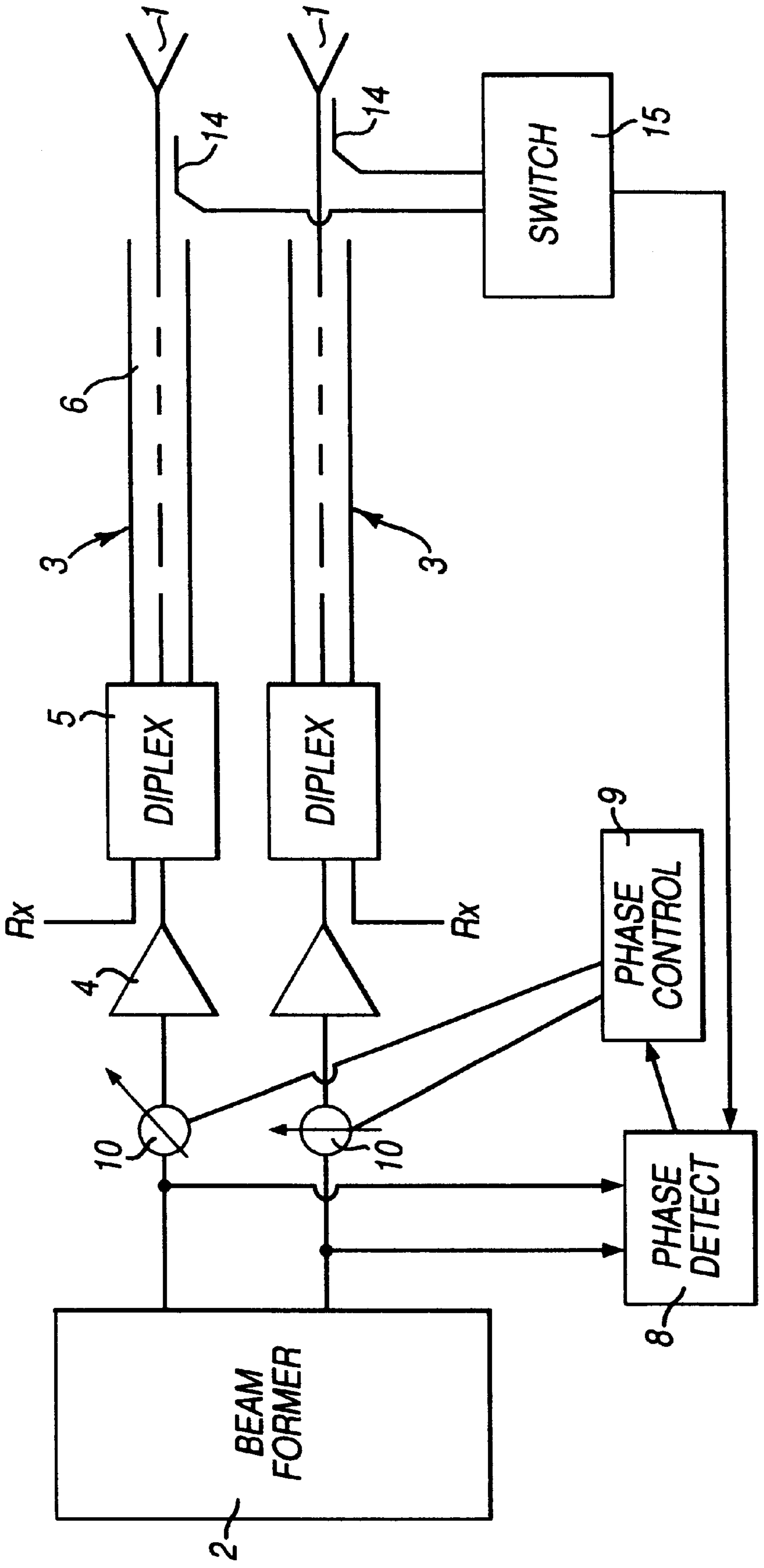
FIG. 2 is a second embodiment of the present invention.

Turning now to FIG. 2, this shows a second embodiment of the present invention which is a modification of the first embodiment. In this second embodiment the same reference numerals are used to indicate the same parts as in the first embodiment and consequently will not be described in detail. The difference between this embodiment and the first embodiment is that signal couplers 14 and a switch 15 are used to replace the monitor probe 12

The switch 15 enables each individual signal path to be separately monitored but it will be understood that the switch could be incorporated within the phase detector circuit itself if this was more convenient. It is important to note, however, that the monitored signal which is fed back to the phase detector should be fed back using a single non-phase critical cable so as to avoid any errors. Any cable whose characteristics will not alter over the period of one correction will suffice for this purpose. This feature results from the fact that phase samples from each element are handled in sequence and it is the basic aim of the invention to monitor and correct the relative phase of each path.

While the above description has been given in relation to monitoring a phase antenna array when in the transmission mode, it will be appreciated that the array could be monitored in a receiving mode. This would principally entail supplying a known pilot signal to a suitably mounted probe from a signal generator and then comparing the received signal with the input signal. This is shown in more detail with reference to FIG. 3.

Figure 3:
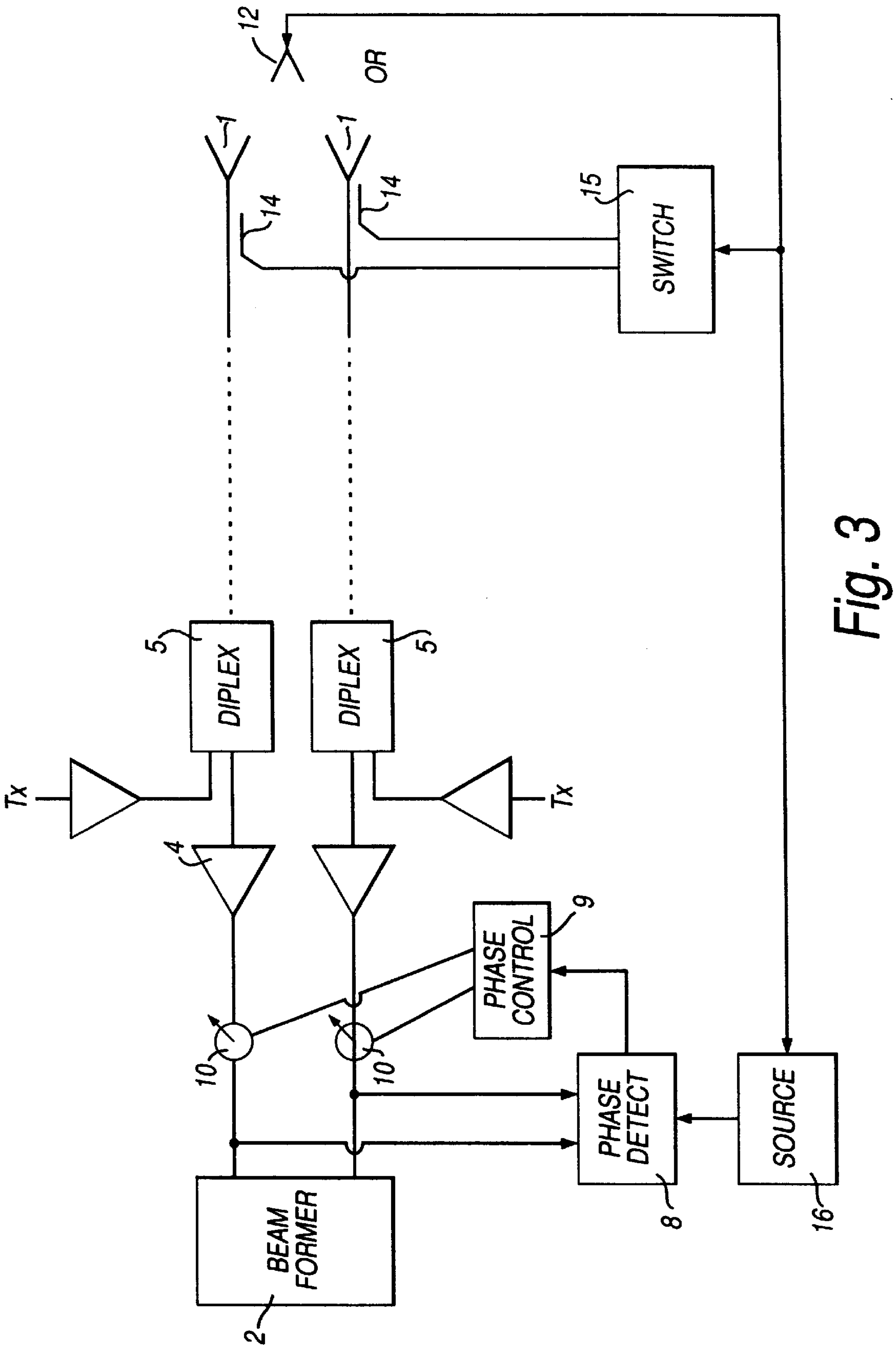
FIG. 3 shows a third embodiment of the present invention.

FIG. 3 is a composite diagram showing the two modifications which are required in order to implement the monitoring of an array of antenna elements by injecting a test signal into the array of elements and detecting the signals at the end of the signal paths adjacent the beam former. The test signal to be injected into the antenna array is derived from a signal source (16) which is connected to either the switch (15) and hence the signal couplers (14) or else the probe (12). The source (16) also sends a test signal to the phase detector where the phase of the test signal is compared with the received signals.

Figure 4:
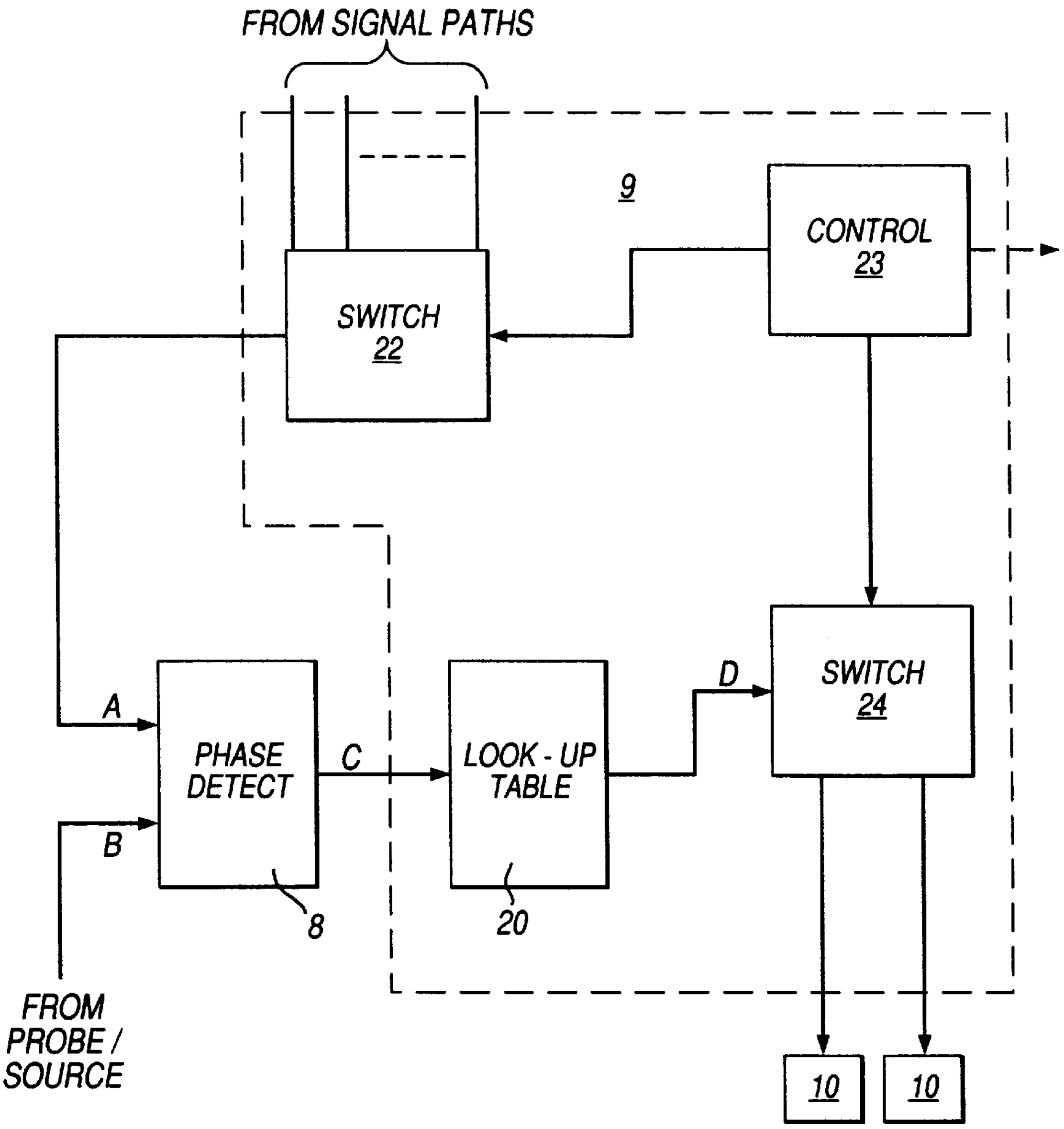
FIG. 4 shows a part of the phase control apparatus which may be used in any of the embodiments.

Referring now to FIG. 4, this shows in more detail how the phase control is carried out by the control circuit 9. Again, the same reference numerals are used for the same parts shown in the other drawings as this type of phase correction can be used in all embodiments described above.

The phase detector (8) receives an output A from the signal path at the beam former and an output B from the monitoring system at the antenna array and compares them to produce an error signal C. The error signal C is fed to a look-up table (20) where the value of the error signal results in a specific output signal D being produced which is applied to the phase shifter (10) of the signal path associated with the antenna element being monitored. A selector circuit (21) is provided to ensure that the output signal A from the signal path and the phase shifter (10) are the correct ones for the antenna element to be monitored. In this diagram, all the signals from the signal paths are supplied to a first switching circuit (22) and the desired signal A is fed to the phase detector circuit (8) under the control of a control circuit (23) which also controls a second switching circuit 24 which directs the output D of the look-up table to the appropriate phase shifter 10. The control circuit (23) has a further output which is used to control the switch circuit (15) if used.

The use of a look-up table allows the use of non-precision phase shifters as the signal required to make a specific phase shifter can be predetermined during initial installation of the antenna array and the calibration thereof so that when the output of the phase detector (8) produces an error signal this is directly converted by the look-up table into the appropriate predetermined signal in order to produce the desired phase shift from that specific phase shifter. Also, the precise pattern formed by the array of antenna elements can be maintained even when the length of the signal path from the beam former (2) to the antenna differs.

It will be understood that with a look-up table, it is not necessary to try to produce a zero error signal from the output of the phase detector; any desired predetermined error signal can result in an output from the look-up table which has now effect on the phase shifter concerned. Equally, different values of error signal can result in the same value being output from the look-up table if desired.

We claim:

1. A method of monitoring an antenna array comprising a plurality of antenna elements each of which is connected to one end of a respective signal path, each of the other ends of which are connected to a beam forming circuit, the method comprising the steps of:

a) selecting one of the elements of the array;

b) applying a first signal of known characteristics to said other end of a respective signal path;

c) detecting at the one end of the said signal path a second signal resulting from the application of said first signal to said element;

d) comparing the detected second signal with the applied first signal whereby to generate an error signal corresponding to any changes in the characteristics of the applied signal due to the signal path;

e) using the error signal to access a stored value in a look-up table; and f) repeating steps a) to e) for each element of the array.

2. A method of monitoring an antenna array according to claim 1, wherein said second signal is detected by a single detector located in the near field of the antenna array and visible to all elements of the array.

3. A method of monitoring an antenna array according to claim 1, wherein said second signal is detected by a signal coupler is associated with each element and the outputs from the couplers are fed to a selector switch, the output of which is fed to the comparing means.

4. A method of monitoring an antenna array according to claim 1, wherein the first signal of known characteristics is a test signal applied when the antenna is not in normal transmission mode.

5. A method of monitoring an antenna array according to claim 4, wherein the first signal is applied using a probe located in the near field of the antenna array and visible to all elements of the array.

6. A method of monitoring an antenna array according to claim 4, wherein the first signal is applied using a signal coupler associated with each element.

7. A method of monitoring an antenna array according to claim 1, wherein the first signal of known characteristics is a signal superimposed on a normal transmission signal.

8. A method according to claim 1 and further including the step of adjusting the phase relationship of each path in accordance with the stored value from the look-up table in order to maintain a predetermined beam pattern for the antenna.

9. In a transmission antenna array comprising a plurality of antenna elements each fed with a respective signal from an amplifier connected to an output from a beam forming circuit, means for monitoring the output of the antenna array elements, and means for controlling the phase of the signal fed to the antenna array element so as to ensure that the output from the antenna corresponds to the desired beam shape, the improvement comprising a single monitoring device, means for causing the single monitoring device to monitor the output from each element in turn, and that said means for controlling the phase of the signal include means for storing phase correction values.

10. In a transmission antenna array comprising a plurality of antenna elements each fed with a respective signal from an amplifier connected to an output from a beam forming circuit, means for monitoring the output of the antenna array elements, and means for controlling the phase of the signal fed to the antenna array element, the improvement comprising a signal coupler associated with each element of the array, a selector switch connected to the signal couplers and to the means for controlling the phase of the signal for selectively connecting one of said signal couplers to the controlling means, and that said means for controlling the phase of the signal include means for storing phase correction values.

* * * * *